United States Patent [19]

Kaneda

[11] 4,026,496
[45] May 31, 1977

[54] AUTOMATIC REPEAT SYSTEM FOR MAGNETIC TAPE RECORDERS AND REPRODUCERS

[75] Inventor: Makoto Kaneda, Sakado, Japan

[73] Assignee: Tokyo Denshi Kabushiki Kaisha, Sakado, Japan

[22] Filed: July 23, 1975

[21] Appl. No.: 598,380

[30] Foreign Application Priority Data

Aug. 19, 1974 Japan .............................. 49-94286
Aug. 19, 1974 Japan .............................. 49-94287

[52] U.S. Cl. .......................... 242/191; 74/483 PB; 242/201
[51] Int. Cl.² ....................................... G11B 15/44
[58] Field of Search .......... 242/189, 190, 201, 202, 242/203, 204, 186, 210

[56] References Cited

UNITED STATES PATENTS

3,469,800  9/1969  Ayukawa et al. .................. 242/190
3,861,620  1/1975  Sekiguchi et al. ................. 242/189

Primary Examiner—George F. Mautz
Attorney, Agent, or Firm—Stevens, Davis, Miller & Mosher

[57] ABSTRACT

An automatic repeat system for magnetic tape recorders and reproducers is disclosed which is provided with an automatic repeat mechanism adapted to set the magnetic tape to its reproducing or rewinding status in response to the resetting of the reproducing lever or rewinding lever to be effected by means of an automatic stop mechanism serving the purpose of resetting the reproducing lever or rewinding lever upon termination of the reproducing or rewinding motion.

7 Claims, 19 Drawing Figures

AUTOMATIC REPEAT SYSTEM FOR MAGNETIC TAPE RECORDERS AND REPRODUCERS

BACKGROUND OF THE INVENTION

As devices for automatically and repeatedly running soundrecorded media, there have heretofore been disclosed (1) an apparatus capable of repeated playing of a chosen music record in a juke box (Japanese published patent application No. 30226/1969) which comprises an arm rotatably disposed on a base plate for controlling the resetting distance of a pickup, an operating pin vertically movably mounted on a part of a lever disposed rotatably on a pickup lifting unit and adapted to determine the pickup resetting position, a contact plate for clutching positioned on said operating pin and adapted to be pressed against a clutch plate fastened to a pickup revolving shaft, whereby desired repeated playing of a chosen music record is effected by having said contact plate pushed against said clutch plate and at the same time causing the lever determining the pickup resetting position to actuate the reset starting lever and consequently drive the pickup resetting unit and (2) a control apparatus capable of continuously driving the magnetic tape alternately in the left and right directions (Japanese Pat. No. 722549) which comprises a starting unit operable in response to the operation of a device for automatically sensing the termination of rewinding of the magnetic tape in the left or right direction or to the operation of a manual control device, an operating gear having a pair of notches cut on the periphery thereof at the opposed positions, starting levers slidably mounted on the plane passing the axis of said operating gear and provided with two end portions adapted to be selectively thrust out through the notches of said operating gear, whereby said continuous and alternating driving of the magnetic tape in the two directions is effected by allowing said starting levers to protrude through the notches of the operating gear and come into engagement with the projections on the driving gear and consequently bring the operating gear in mesh with the driving gear, subsequently causing the slide plate to be moved in the left or right direction by virtue of the rotation of said operating gear and the pair of pinch rollers to be brought into pressed contact with their respective capstans, for example.

Said apparatus for the repeated playing of a chosen music record in the juke box, however, involves a complicated process in that a plurality of levers are to be interlocked effectively for the revolution of the pickup. And, said control apparatus designed to provide continuous driving of the magnetic tape in both directions effects the engagement of the operating gear and the driving gear by causing the starting lever to be brought into mesh with the projections of the driving gear and, for this reason, requries both the starting lever and the driving gear to be composed of parts having sufficiently high mechanical strength and ample dimensional stability.

SUMMARY OF THE INVENTION

It is an object of this invention to provide an automatic repeat system for magnetic tape recorders and reproducers, provided with a mechanism adapted to set the magnetic tape to its reproducing or rewinding status in response to the resetting of the reproducing lever or rewinding lever to be effected by means of an automatic stop mechanism serving the purpose of resetting the reproducing lever or rewinding lever upon termination of the reproducing or rewinding motion of the magnetic tape.

The mechanism which sets the magnetic tape to the automatic repeat status according to the present invention comprises, in combination, a selection unit adapted to rotate in response to the motion of the reproducing lever or rewinding lever, a second toothed gear adapted to be rotated by said selection unit and provided with two notches and a first toothed gear adapted to engage with said second toothed gear when the second toothed gear is rotated by said selection unit and consequently impart rotary motion to said selection unit and the second toothed gear.

Further, addition to the aforementioned mechanism of a lifting unit which is composed of a clutch lever adapted to move said selection unit to a position for intimate contact with the projections of the reproducing lever or rewinding lever and a selection lever serving to impart rotary motion to said clutch lever and at the same time close the switch for the first toothed wheel and a release unit which is adapted to simultaneously set said lifting unit to its stationary status and open the switch of the first toothed wheel enables the automatic repeat status to be established at any desired time according to this invention.

The term "selection unit" used in the present invention refers to a mechanism which is composed of a selection member adapted to be brought into engagement with the projections on the reproducing lever or rewinding lever when said lever is about to be reset by the motion of the automatic stop mechanism and consequently rotated in response to the reproducing lever or rewinding lever and a first arm and a second arm adapted to be interlocked with said selection member and consequently rotated thereby.

The automatic stop mechanism which is used for the present invention may be of any operating principle insofar as there is provided a function capable of resetting the reproducing lever or rewinding lever upon termination of the reproducing or rewinding motion of the magnetic tape. For example, there can be cited a device capable of resetting the reproducing lever or rewinding lever on sensing an increased tension in the magnetic tape which occurs when the reproducing or rewinding has proceeded to reach the reel end of the magnetic tape. To be specific, in a stop mechanism of the type such that a relay pulley interposed between a rewinding pulley and an idler pulley driven by a flywheel is retracted by the rewinding pulley in the direction of its rotation after the rewinding motion of the magnetic tape has terminated upon arrival at the reel end and before the idler pulley begins to rotate, there is an automatic rewind stop mechanism for sound recorders and reproducers which is provided with a pin disposed in the idler lever serving to stop the dragging motion, a hook stopper releasable by a rotary arm, a switch for opening the power source connection and stopping the rotation, a rewinding lever serving to open and close said switch and a pin disposed on the rewinding lever to open said switch and then retract the rotary arm. In the preferred embodiments to be described afterward, this automatic stop mechanism was adopted.

BRIEF EXPLANATION OF THE DRAWING

The drawings annexed hereto illustrate preferred embodiments of the present invention.

DETAILED DESCRIPTION OF THE INVENTION

Figures 1, 2:
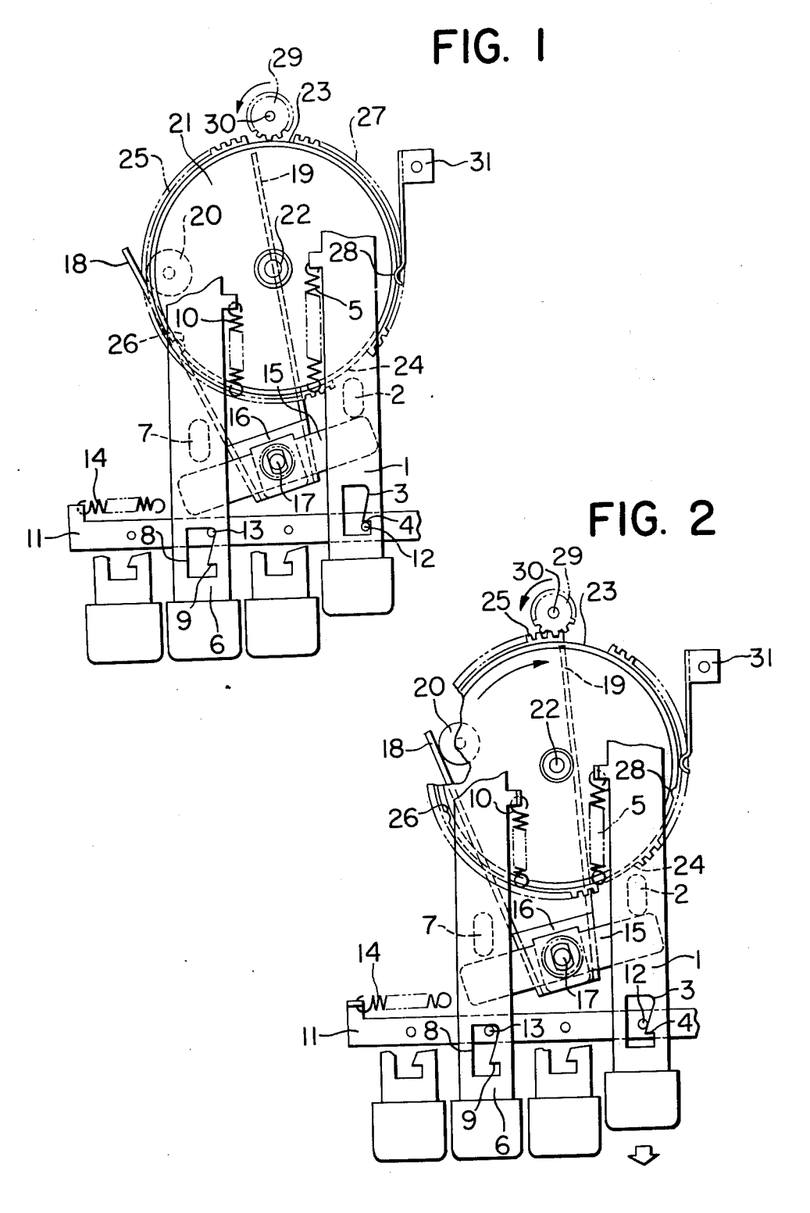
FIG. 1 is a plan view illustrating the system of this invention in its reproducing status.
FIG. 2 is a plan view illustrating the system in which the reproducing lever is in the reset status.

One preferred embodiment of the present invention will be described with reference to FIG. 1 through FIG. 4. In FIG. 1, the tape recorder of the present invention is illustrated in its reproducing status, with the reproducing lever 1 depressed and, consequently, the pin 12 of the stop member 11 stopped by the hook 4 in the oblong groove 3 formed in the reproducing lever 1. In this case, the first toothed wheel 29 is kept in its rotary motion because the first notch 23 cut in the second toothed wheel 21 is placed opposite the first toothed wheel 29 and therefore the second toothed wheel 21 interlocked with the roller 20 and supported by the pivot 22 and the first toothed wheel 29 supported by the pivot 30 serving to impart rotary motion to this second toothed wheel 21 are not in engagement with each other. In the meantime, the second toothed wheel 21 is kept motionless by the elastic member 31 which is fastened to the first groove 28 cut in the second toothed wheel 21. In this case, the selection member 15 which is held in contact with the projection 2 disposed on the reproducing lever 1 and the projection 7 disposed on the rewinding lever 6, the operating member 16 which is coaxially connected via the bearing 17 to the center of the selection member 15, the first arm 18 which is connected to one end of said operating member 16 and the second arm 19 which is connected to the other end of said operating member 16 are all in their inoperative status because the second toothed wheel 21 is motionless.

In the magnetic tape recorder which is kept in the reproducing status as shown in FIG. 1, when the magnetic tape is wound out to the reel end, the automatic stop mechanism (not shown) senses an increased tension in the magnetic tape and moves the stopper member 11 which has kept the reproducing lever 1 caught by the pin 12 by virtue of the hook 4 in the oblong groove 3 cut in the reproducing lever 1, with the result that the pin 12 is released from the hook 4 of the reproducing lever 1. Consequently, the reproducing lever 1 attempts to reset itself by means of the resilience of the spring 5 as illustrated in FIG. 2. In the course of this resetting, the projection 2 disposed on the reproducing lever 1 comes into contact with the selection member 15 and the reproducing lever 1, by virtue of the resilience of the spring 5, tends to reset itself while keeping in company the selection member 15, so that the selection member 15 revolves around the bearing 17 while keeping in company the operating member 16, the first arm 18 and the second arm 19. And the first arm 18 comes into contact with the roller 20 disposed on the second toothed wheel 21 and causes this roller 20 to be revolved in the direction of the arrow. During the reproduction and in the early stage of the resetting of the reproducing lever 1 shown in FIG. 1, the first tooth portion 25 of the second toothed wheel 21 and the first toothed wheel 29 are out of mesh because of the first notch 23. As the first arm 18 causes the roller 20 to be revolved as mentioned above, the first tooth portion 25 of the second toothed wheel 21 eventually comes into engagement with the first toothed wheel 29, with the result that the second toothed wheel 21 is rotated by the motion of the first toothed wheel 29. In consequence of this rotation, the selection member 15 comes into contact with the projection 7 of the rewinding lever 6 which has been in a stationary status, retracts the rewinding lever 6 and causes the pin 13 of the stopper member 11 to be locked in the hook 9 of the rewinding lever 6, establishing a rewinding status. At this time, the second notch 24 of the second toothed wheel 21 is positioned opposite the first toothed wheel 29 and the second groove 26 is brought into engagement with and stopped by the resilient member 31, so that the second toothed wheel 21 remains motionless. When the rewinding is terminated, the automatic stop mechanism senses the change of tension in the magnetic tape at the reel end and causes the lock by the lock pin 13 to be released. Consequently, the rewinding lever 6 tends to reset itself by virtue of the resilience of the spring 10. In the course of this resetting, the projection 7 disposed on the rewinding lever 6 is brought into contact with the selection member 15 and causes the selection member 15 to revolve around the bearing 17 by virtue of the resilience of the spring 10 connected to the rewinding lever 6 while keeping in company the operating member 16, the first arm 18 and the second arm 19. Consequently, the second arm 19 comes into engagement with the roller 20 disposed on the second toothed wheel 21, causes this roller 20 to be revolved in the direction shown by the arrow so as to bring the second tooth portion 27 of the second tooth wheel 21 into mesh with the first toothed wheel 29. Because of the rotation of the first toothed wheel 29, the projection 2 of the reproducing lever 1 which has remained in a stationary status is moved in the direction of retracting the reproducing lever 1 as shown in FIG. 3, with the result that the reproducing lever 1 is locked by the pin 12 as shown in FIG. 1, bringing the tape recorder in its reproducing status.

As described above in the present system, the automatic stop mechanism which resets the reproducing lever 1 or rewinding lever 6 upon detection of an abrupt change in the tension of the magnetic tape at the reel end after termination of the reproducing or rewinding motion functions to cause the projection 2 or 7 disposed on the reproducing lever 1 or rewinding lever 6 to come into contact with the selection member 15, impart rotary motion to the first arm 18 and the second arm 19 connected to the selection member 15 and consequently rotate the roller 20 disposed on the second toothed wheel 21, bring the first tooth portion 25 or the second tooth portion 27 of the second toothed wheel 21 into engagement with the first toothed wheel 29 to impart rotary motion to the second toothed wheel 21 by the motion of the first toothed wheel 29 and retract the reproducing lever 1 or rewinding lever 6 which has been in a stationary status so as to initiate the reproducing or rewinding motion. The foregoing series of operation is automatically continued by the present system. As a matter of course, the rewinding lever 6 is in a stationary status while the system is in its reproducing status as shown in FIG. 1 and the reproducing lever 1 is in a stationary status while the system is in its rewinding status as shown in FIG. 3. The first toothed wheel 29 is designed so as to be given motive force by a motor (not illustrated). As regards the means for transmission of said motive force, there may be adopted a method involving direct connection of the wheel to the motor or a method whereby the wheel is driven by the medium such as of a pulley, whichever suits the occasion. The switch for the first toothed wheel 29 is independent of the switch which serves the automatic stop mechanism. Consequently, the first toothed wheel 29 remains in motion even when the switch for the reproducing lever 1 or the rewinding lever 6 is turned off as shown in FIG. 2 or FIG. 4, so that the aforementioned alternate series of reproducing-rewinding operations can be automatically continued smoothly.

Figures 3, 4:
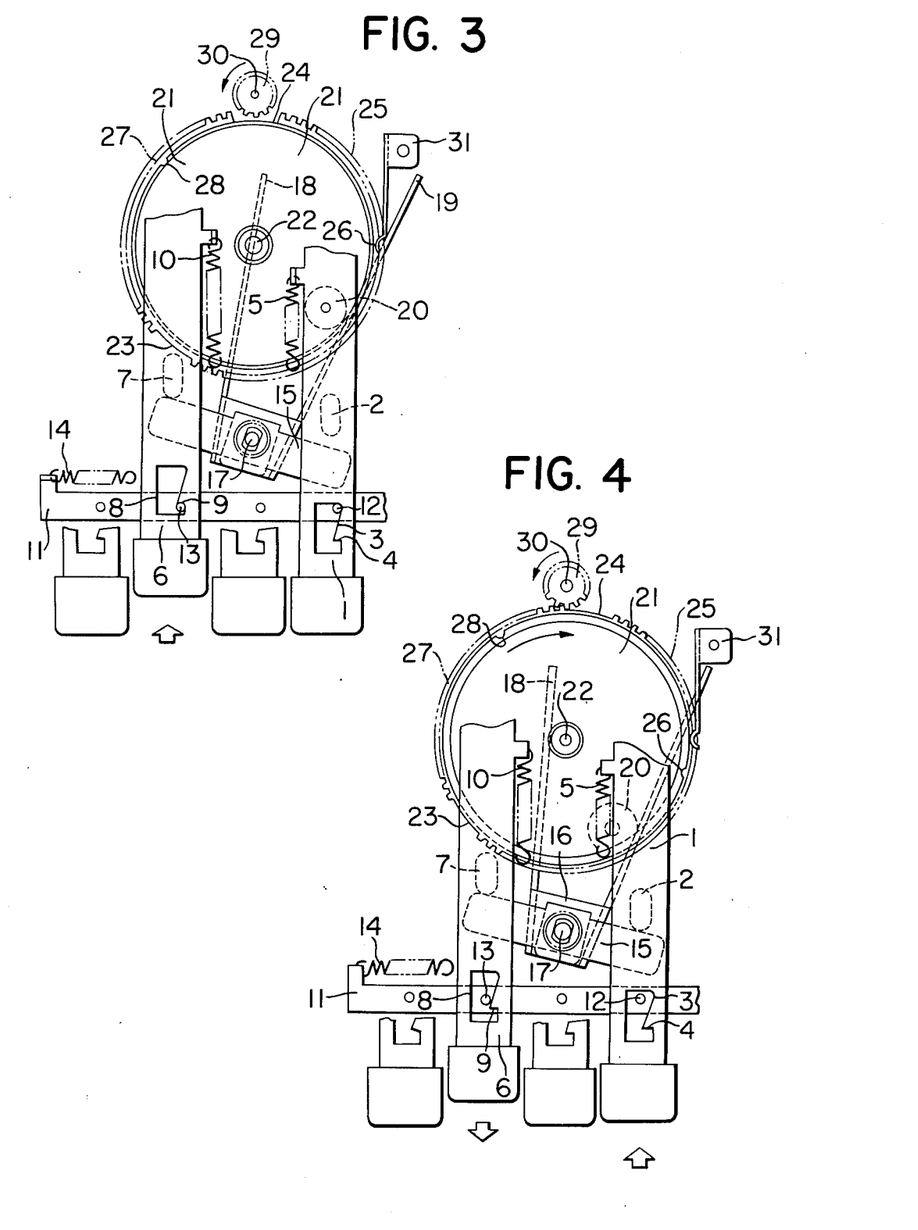
FIG. 3 is a plan view illustrating the system in its rewinding status.
FIG. 4 is a plan view illustrating the system in which the rewinding lever is in its reset status.
Figure 5:
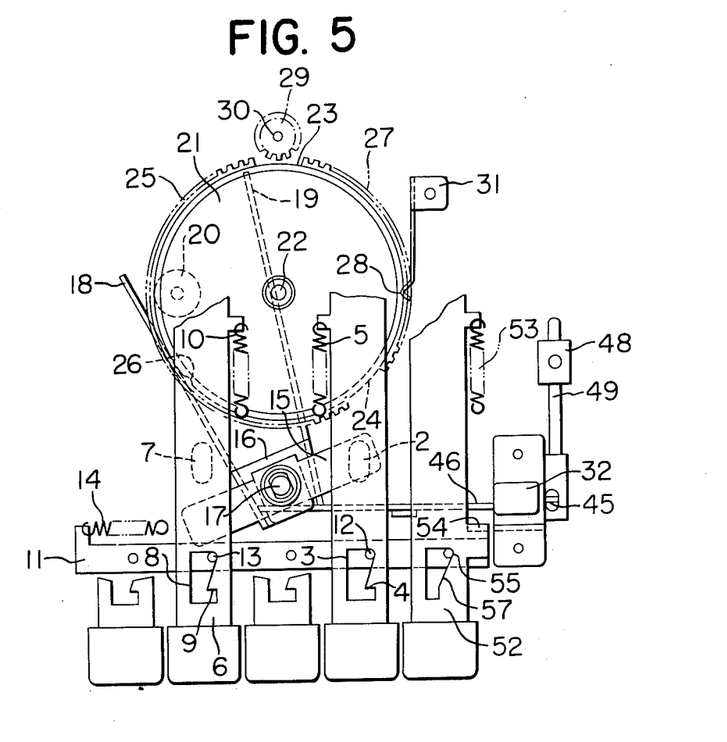
FIG. 5 is a plan view illustrating another preferred embodiment of this invention in its stationary status.

When the first toothed wheel 29 and the second toothed wheel 21 are not in mesh with each other, namely when the first notch 23 or the second notch 24 of the second toothed wheel 21 is positioned opposite the first toothed wheel 29 as shown in FIG. 1 or FIG. 3, the second toothed wheel 21 is kept in its stationary status by having the elastic member 31 kept in fast engagement with the first groove 28 or the second groove 26 in the second toothed wheel 21.

As described above, the automatic repeat system for magnetic tape recorders and reproducers according to the present invention automatically sets the magnetic tape to its automatic repeat status in responce to the automatic stop mechanism which is adapted to sense an abrupt change in the tension of the magnetic tape at the reel end after termination of the reproducing or rewinding operation and resets the reproducing or rewinding lever. Thus, it has an advantage that the automatic repeat status can be provided safely without requiring any complicate manipulation.

The present invention will further be described herein below with reference to FIG. 5 through FIG. 19 illustrative of another preferred embodiment. Illustrated is an automatic repeat system for a magnetic tape recorder and reproducer of the type which is provided with an automatic stop mechanism adapted to sense an abrupt change in the tension of the magnetic tape at is reel end after termination of the reproducing or rewinding operation and resets the reproducing or rewinding lever, said automatic repeat system being provided with a mechanism for setting the magnetic tape to an automatic repeat status in response to the resetting of the reproducing lever or rewinding lever caused by said automatic stop mechanism and a mechanism for cancelling said automatic repeat status.

Figure 6:
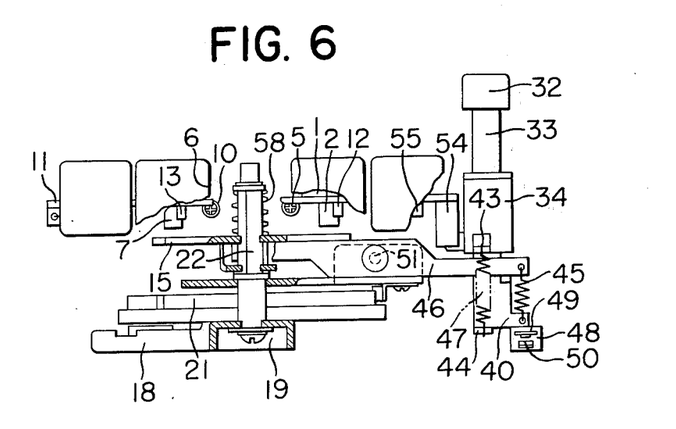
FIG. 6 is a front view of FIG. 5.
Figure 7:
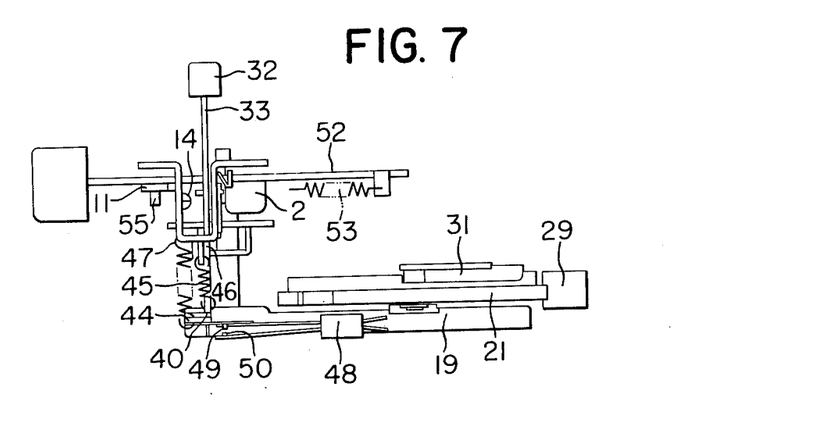
FIG. 7 is a side view of FIG. 5.
Figure 9:
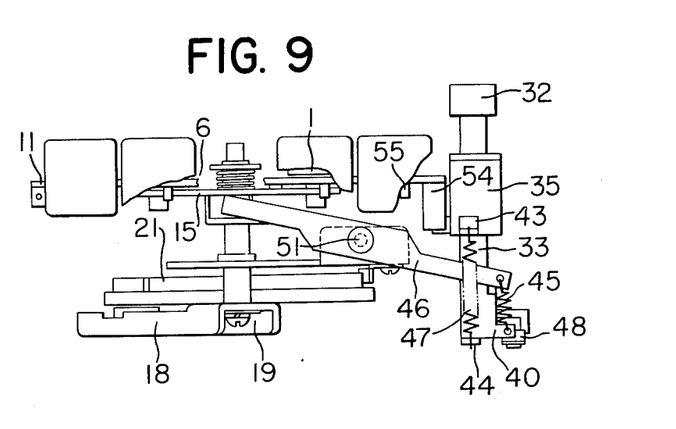
FIG. 9 is a front view of FIG. 8.
Figure 14:
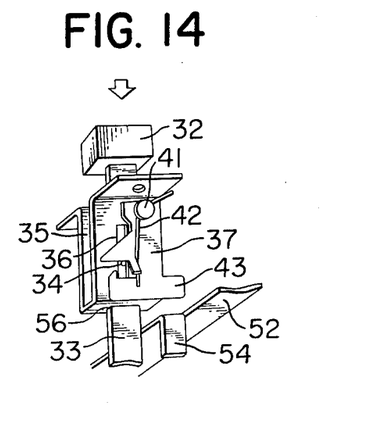
FIG. 14 is a perspective view illustrating the lifting unit in its operating status.

While this system is in its normal status, the component mechanisms are kept in their respective stationary state as illustrated in FIG. 5 through FIG. 7 and FIG. 13. To put this system into operation, the selection button 32 is depressed as shown in FIG. 14. Consequently, the lock pin 34 disposed on the selection lever 33 slides down the oblong bore 36 cut in the side face of the angle 35 and, while sliding on the surface of the protrusion 38 of the lock member 37 set in conjunction with the spring 42 via the bearing 41 onto the angle 35, forces down the lock member 37 in the direction indicated by the arrow, with the result that the lock pin 34 is locked between the lower end of the protrusion 38 of the lock member 37 and the upwardly bent protrusion 39 of the lock member 37. At this time, the selection lever 33 is locked by the medium of the lock pin 34 as described above and, at the same time, the spring 45 connected to the protrusion 40 disposed on the lower end of the selection lever 33 as shown in FIG. 9 causes one end of the clutch lever 46 on the selection lever 33 side to be forced down with the bearing 51 serving as the fulcrum and the other end of the clutch lever 46 to be pushed up, with the result that the clutch lever 46 which has remained in a stationary status as shown in FIG. 6 is moved out of position. As the result, the selection member 15 which has been held in a stationary status as shown in FIG. 6 is moved so as to be brought into engagement with the protrusions 2 and 7 disposed respectively on the reproducing lever 1 and the rewinding lever 6 as illustrated in FIG. 9. In the meantime, when the selection lever 33 is locked by the medium of the lock pin 34 as described above, the lower end of the protrusion 40 disposed on the lower end of the selection lever 33 causes the elastic terminals 49 and 50 of the switch 48 which has been in an opened status as shown in FIG. 6 to move and form a closed circuit as shown in FIG. 9, establishing a power source connection to the first toothed wheel 29 and setting the first toothed wheel 29 rotating. And the spring 47 serving to connect the bent projection 44 of the selection lever 33 and the projection 43 disposed on the angle 35 is stretched out under the pressure exerted by the selection lever 33.

Figure 8:
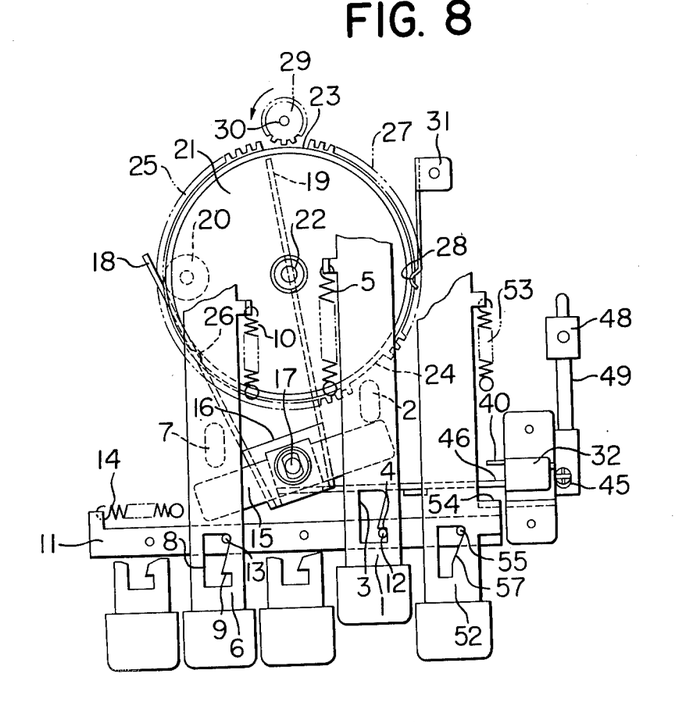
FIG. 8 is a plan view illustrating the system in its reproducing status.
Figure 10:
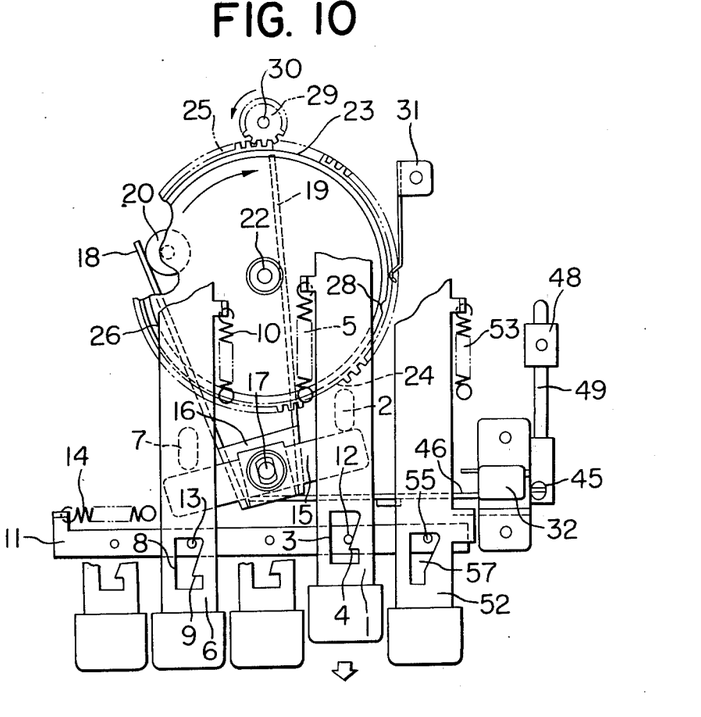
FIG. 10 is a plan view illustrating the status assumed on termination of the reproducing motion.
Figure 11:
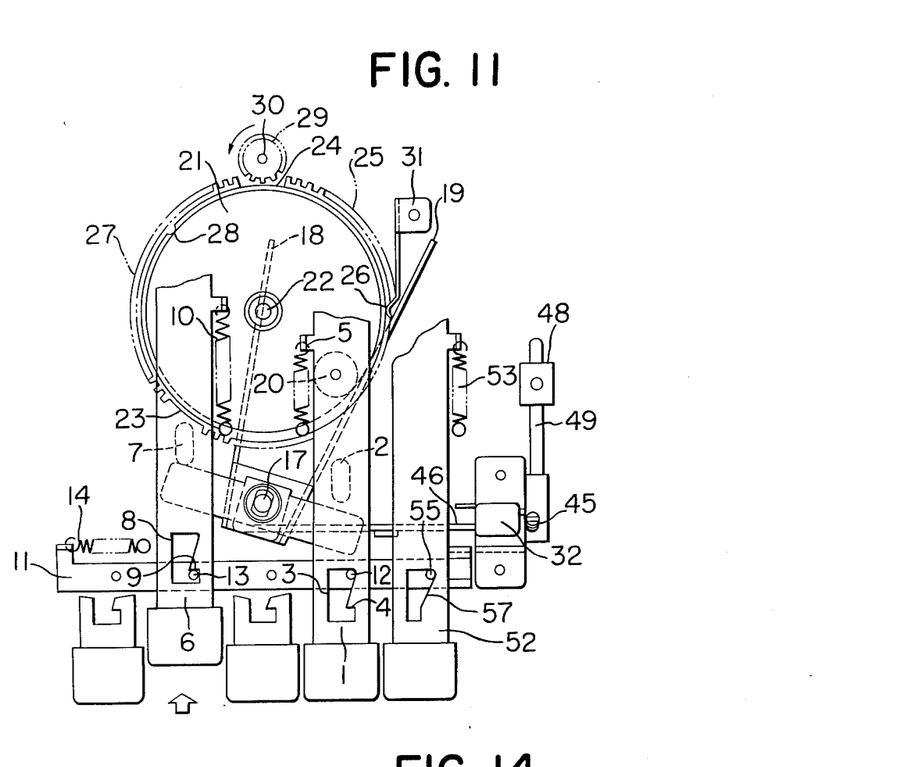
FIG. 11 is a plan view illustrating the system in its rewinding status.
Figure 12:
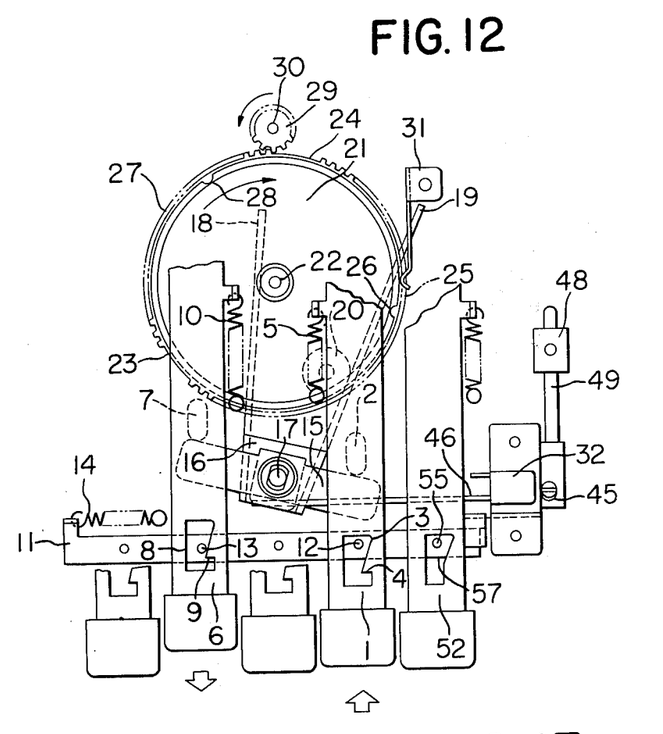
FIG. 12 is a plan view illustrating the status assumed on termination or the rewinding motion.
Figure 13:
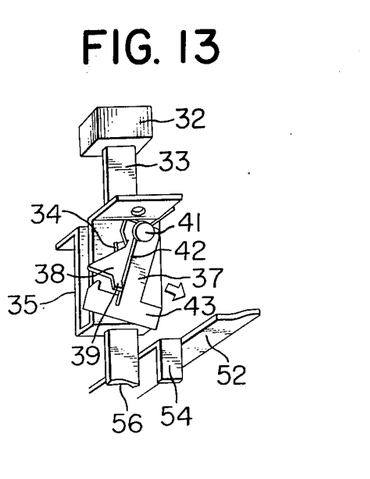
FIG. 13 is a perspective view illustrating the cardinal portion of the lifting unit and the release lever in the system of FIG. 5.

When the reproducing lever 1 is subsequently depressed as shown in FIG. 8, the oblong groove 3 slides along the pin 12 disposed on the stopper member 11 and permits the pin 12 to be stopped by the hook 4, establishing a reproducing status. When the reproducing operation is terminated, the automatic stop mechanism senses an abrupt change in the tension of the magnetic tape at the reel end and releases the reproducing lever 1 from the pin 12 as shown in FIG. 10, with the result that the reproducing lever 1 tends to reset itself. In the course of this of the reproducing lever 1, since the selection member 15 has already been moved under the pressure exerted by the selection lever 33 to a position capable of engagement with the projections 2 and 7 of the reproducing lever 1 and the rewinding lever 6, the projection 2 disposed on the reproducing lever 1 is brought into contact with the selection member 15, and the selection member 15, while keeping in company the operating member 16, the first arm 18 and the second arm 19, is revolved by the resilience of the spring 5 of the reproducing lever 1 with the bearing 17 as the fulcrum, causing the first arm 18 to come into contact with the roller 20 disposed on the second toothed wheel 21 and the roller 20 to be revolved by the first arm 18 in the direction indicated by the arrow. During the reproducing operation, the first tooth portion 25 of the second toothed wheel 21 was not in engagement with the first toothed wheel 29 by the intervention of the first notch 23 therebetween as shown in FIG. 8. Now that the roller 20 is revolved by the first arm 18 as described above, the first tooth portion 25 of the second toothed wheel 21 comes into engagement with the first toothed wheel 29 as shown in FIG. 10 and the motion of the first toothed wheel 29 causes the second toothed wheel 21 to revolve. This revolution of the second toothed wheel 21 causes the selection member 15 to come into contact with the projection 7 on the rewinding lever 6 which has been in a stationary status, retracts the rewinding lever 6 and resets the reproducing lever 1 completely. Thus, there is assumed a rewinding status as shown in FIG. 11. At this time, the second notch 24 of the second toothed wheel 21 is positioned opposite the first toothed wheel 29 and the second groove 26 cut in the first tooth portion 25 is held in mesh with the elastic member 31, so that the second toothed wheel 21 is kept motionless. When the rewinding operation is terminated consequently, the automatic stop mechanism senses an abrupt change in the tension of the magnetic tape at the reel end and releases the rewinding lever 6 from the pin 13 and tends to reset the rewinding lever 6 as shown in FIG. 12. In the course of this resetting of the rewinding lever 6, the projection 7 disposed on the rewinding lever 6 comes into engagement with the selection member 15, and the selection member 15, while keeping in company the operating member 16, the first arm 18 and the second arm 19, is revolved around the bearing 17 by virtue of the resilience of the spring 10 of the rewinding lever 6, with the result that the second arm 19 is brought into engagement with the roller 20 disposed on the second toothed wheel 21 and the roller 20 is revolved by the second arm 19 in the direction indicated by the arrow. Thus as shown in FIG. 11, the second tooth portion 27 of the second toothed wheel 21 was not in engagement with the first toothed wheel 29 because of the intervention of the second notch 24 therebetween in the course of the rewinding operation. Now that the roller 20 is revolved by the second arm 19 as described above, the second tooth portion 27 of the second toothed wheel 21 comes into engagement with the first toothed wheel 29 as shown in FIG. 12 and the motion of the first toothed wheel 29 sets the second toothed wheel 21 revolving. Consequently, the revolution of the second toothed wheel 21 causes the selection member 15 to come into engagement with the projection 2 of the reproducing lever 1 which has remained in a stationary status and resets the rewinding lever 6 completely, establishing a reproducing status as shown in FIG. 1. At this time, the second toothed wheel 21 remains motionless because the first notch 23 of the second toothed wheel 21 is positioned opposite the first toothed wheel 29 and the first groove 28 cut in the second tooth portion 27 is held fast by the elastic member 31.

As explained above, the present system enables the alternate reproducing and rewinding operations to be automatically carried out repeatedly.

Figure 15:
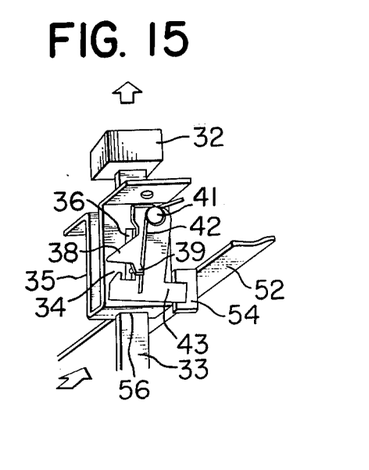
FIG. 15 is a perspective view illustrating the relationship between the lifting unit and the release lever at the time the release lever is kept in its depressed condition.

To cancel the automatic repeat status of the alternate reproducing and rewinding operations described above, the release lever 52 is to be depressed. Consequently, the selection button 32 is pushed down as shown in FIG. 14 and the downwardly bent piece 54 of the releave lever 52 comes into engagement, as shown in FIG. 15, with the tip 43 of the lock member 37 which has been stopped by the lock pin 34 of the selection lever 33, with the result that the lock member 37 is pressed down and the lock of the lock pin 34 is released. Thus, the selection lever 33 resets itself into the status shown in FIG. 13 and opens the elastic terminals 49 and 50 of the switch 48 and, at the same time, the clutch lever 46 is also brought into a stationary status as shown in FIG. 6. In consequence of the operation described above, the present system senses an abrupt change in the tension of the magnetic tape at its reel end after termination of the reproducing or rewinding operation and resets the reproducing level 1 or rewinding lever 6. It does not set the magnetic tape to its automatic repeat status in this case.

As described above, the present system only requires a depression on the selection button 32 in order to establish the automatic repeat status of the alternate reproducing and rewinding operations. And cancellation of this status can be obtained by merely depressing the release lever 52. Thus, the automatic repeat status can be established at any desired time.

Figure 16:
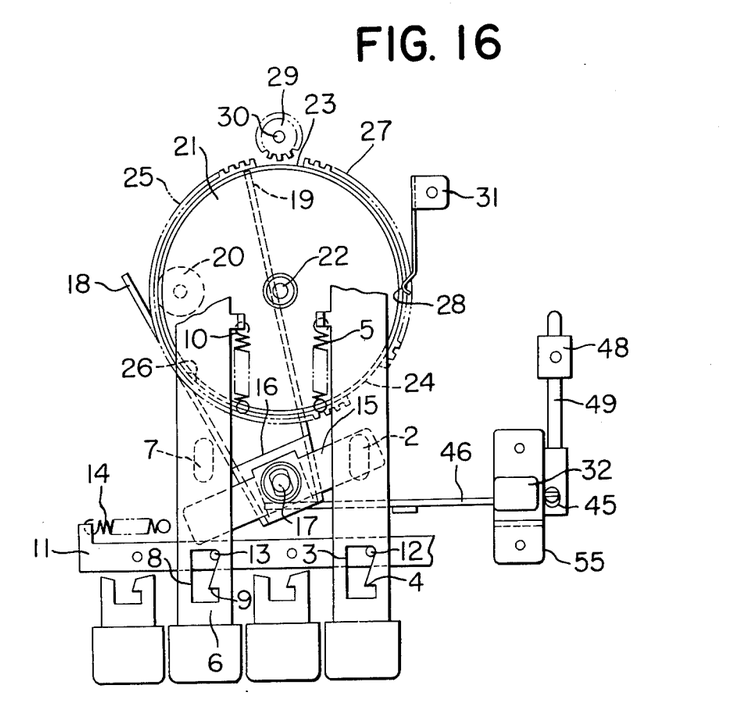
FIG. 16 is a plan view illustrating one preferred embodiment wherein the lifting unit is used concurrently as release means.
Figure 17:
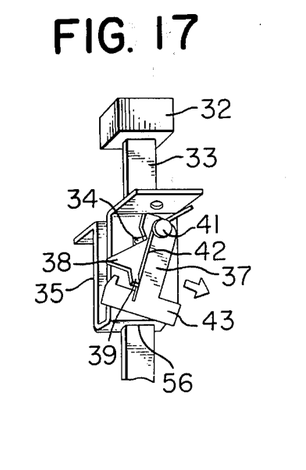
FIG. 17 is a perspective view of the lifting unit of FIG. 16.
Figure 18:
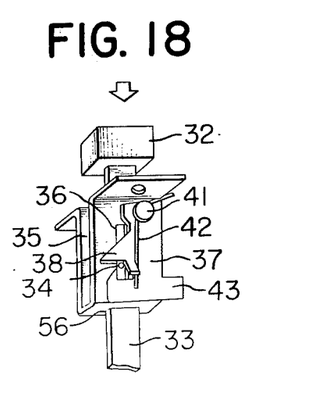
FIG. 18 is a perspective view illustrating the lifting unit in its operating status.
Figure 19:
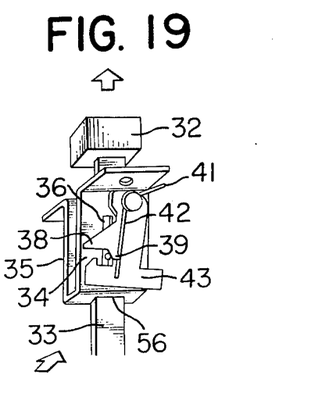
FIG. 19 is a perspective view illustrating the lifting unit while it is operated to discharge the part of release means.

In the preferred embodiments described above, the release lever 52 was adopted as means for cancellation of said status. It is also possible to use the lifting unit as such means. FIG. 16 represents a plan view of the system which excludes use of such release lever. As shown in FIG. 17 through FIG. 19, required automatic repeat status can be obtained by sole use of the lifting unit. This system is similar to the preceding embodiment in that the step of closing the switch 48 for the first toothed wheel 29 and consequently establishing an automatic repeat status by depressing the selection button 32 and the subsequent steps except for that particular step for cancelling said status are all involved. They differ with respect to means for opening the switch 48 for the first toothed wheel 29. To be more specific, when the switch 48 is opened, the selection button 32 is to be depressed once more. Consequently, the lock pin 34 slides along the upwardly bent projection 39 of the lock member 37 and pushes up the lock member 37, with the result that the lock member 37 is pushed back by the resilience of the spring 42 into a stationary status as shown in FIG. 17. As the result, the lock pin 34 is returned to the upper end of the oblong bore 36 of the angle 35 as shown in FIG. 17 instead of being stopped by the lock member 37 as shown in FIG. 18. The switch 48 of the first toothed wheel 29 is consequently opened and the system is not put to its automatic repeat status.

What is claimed is:

1. An automatic repeat system for magnetic tape recorders and reproducers, comprising:
   a reproducing member for controlling a reproducing operation;
   a rewinding member for controlling a rewinding operation;

a selection member mounted for pivotal movement about an axis of rotation and engageable with said reproducing and rewinding members;

a first toothed driving wheel;

a second toothed driven wheel having first and second notches in the toothed portion thereof and mounted such that the toothed portion thereof engages said first toothed driving wheel and is driven thereby, said first and second wheels being disengaged when one of said first and second notches lies adjacent first toothed wheel;

first and second arms mounted on said selection member for rotation therewith;

a further member mounted on said second toothed wheel and located between said first and second arms, said first and second arms alternately engaging said further member to urge said further member and said second toothed wheel into rotational movement to engage the teeth of said second wheel with the teeth of said first wheel;

means for moving said reproducing member from a first to a second position upon termination of a reproducing operation such that said reproducing member rotates said selection member in a first direction and said first arm engages said further member to rotate said second toothed wheel into operative engagement with said first toothed wheel; and means for moving said rewinding member from a first to a second position upon termination of a rewinding operation such that said rewinding member rotates said selection member in a second direction and said second arm engages said further member to rotate said second toothed wheel into operative engagement with said first toothed wheel.

2. An automatic repeat system according to claim 1, wherein:

said selection member engages said rewinding member in said first direction of rotation to move said rewinding member from its second to its first position; and said selection member engages said reproducing member in said second direction of rotation to move said reproducing member from its second to its first position.

3. An automatic repeat system according to claim 1, further comprising:

first and second grooves formed in said second wheel; and an elastic member engaging one of said grooves when one of said notches lies adjacent said first wheel to retain said second wheel against further rotational movement.

4. An automatic repeat system according to claim 1, further comprising:

means for moving said selection member between an operative position in which said selection member engages at least one of said reproducing and rewinding members and an inoperative position in which said selection member is disengaged from said reproducing and rewinding members.

5. An automatic repeat system according to claim 4, wherein said means for moving said selection member between its operative and inoperative positions comprises:

a shaft on which said selection member is mounted for axial and rotational movement;

a clutch member mounted for pivotal movement and having one end portion engaging said selection member; and clutch member pivot means coupled to the other end portion of said clutch member to pivotally move said clutch member to thereby axially move said selection member into its operative position.

6. An automatic repeat system according to claim 5, further comprising:

resilient means normally biasing said selection member towards its inoperative position;

locking means to lock said clutch member in its pivoted position to hold said selection member in its operative position; and means to disengage said locking means to permit said resilient means to return said selection member to its inoperative position.

7. An automatic repeat system according to claim 5, further comprising:

switch means coupled with said clutch member pivot means and with means for driving said first toothed wheel to energize said driving means when said clutch member pivot means is operated to pivot said clutch member to move said selection member into its operative position.

* * * * *